United States Patent Office 3,337,646
Patented Aug. 22, 1967

3,337,646
HYDROGENATION OF CUMYL ALCOHOL
TO CUMENE
Sargis Khoobiar, Clifton, N.J., assignor to Halcon International, Inc., a corporation of Delaware
No Drawing. Filed July 7, 1964, Ser. No. 380,931
17 Claims. (Cl. 260—667)

This invention relates to processes for the hydrogenolysis of a hydrocarbon alcohol especially an aryl carbinol in the presence of nickel-chromia or the like catalyst supported on active basic alumina and also to the catalyst as well as to its preparation.

It is especially useful in the manufacture of epoxides by a process in which an olefinic substrate, oxygen and hydrogen are the only consumed raw materials, and an ankyl-aromatic compound having at least one hydrogen atom on a carbon adjacent to the aromatic ring (preferably cumene or ethylbenzene) is employed. One embodiment of this invention relates to a process for the manufacture of propylene oxide via the epoxidation of propylene with cumyl hydroperoxide in which the hydroperoxide is converted to the corresponding alcohol, the alcohol is reacted with hydrogen to convert it to cumene and the cumene is reacted with oxygen to form cumyl hydroperoxide, which is recycled.

Propylene oxide and similar epoxy compounds are increasingly important intermediates for chemical manufacture. Other epoxy compounds are also very valuable and important materials of commerce, including those from unsaturated esters and alcohols, and from dienes, and the like.

Previous workers have employed processes for the epoxidation of lower olefins, such as propylene, which use very active materials such as peracids as epoxidizing agents. For example, peracetic acid has found wide use in these epoxidations. However, the use of peracetic acid is not wholly satisfactory, since it is costly to manufacture. Additionally, the by-product acetic acid formed during epoxidation cannot always be readily marketed.

Aralkyl hydroperoxide may be used as epoxidizing agents; however, there may be a prohibitive loss of the aralkyl carbon skeleton during recovery from the alcohol if usual techniques are employed.

This invention provides an answer to the problem of producing propylene oxide or other epoxides and the like in an economical fashion while conserving essential aralkyl carbon skeleton values.

The discoveries associated with the invention and relating to the solution of the above problems, and other objects achieved in accordance with the invention as set forth herein include the provision of:

A process for the conversion of a hydrocarbon alcohol to the corresponding hydrocarbon which comprises reacting said alcohol with hydrogen in the vapor phase in the presence of a hydrogenating metal plus modifier catalyst, said hydrogenating metal being a member of the group consisting of Ni, Zn, Cu, Co, Ag and Sn, said modifier being a member of the group consisting of alkali, alkaline earth, chromium and iron, said catalyst containing 30 to 99% of the hydrogenating metal based on the latter metal plus modifier, the latter being calculated as its lowest valence state oxide;

such a process wherein the catalyst is on a support, the reaction temperature being in the range of 150° to 500° C. and sufficient to maintain the alcohol in the vapor phase, and in the catalyst, relative to the support, the hydrogenating metal is in the range of 3 to 50%, the modifier is in the range of 1 to 30%, and the catalyst includes basic material in an amount in the range of 1 to 15%;

such a process wherein the support is active alumina, the hydrogenating metal is Ni, the alcohol is an aryl carbinol, and the mole ratio of hydrogen to alcohol is in the range of 1 to 8;

such a process wherein the catalyst contains 1 to 15% of barium oxide or of iron oxide, relative to alumina;

such a process wherein prior to reduction, the catalyst contains:

|  | Parts |
|---|---|
| Activated $Al_2O_3$ | 100 |
| $Cr_2O_3$ | 1 to 20 |
| NiO | 3 to 20 |
| KOH | 2 to 12 | such a process wherein cumyl alcohol is reduced to cumene with substantially complete conversion and selectivity;

such a process wherein the cumene is converted to its hydroperoxide by reaction with gaseous oxygen, the hydroperoxide being reacted with an oxidizable substrate and converted to cumyl alcohol, which is recycled;

a catalyst useful for hydrogenolysis comprising a hydrogenating metal plus modifier on a support containing basic material, said hydrogenating metal being a member of the group consisting of Ni, Zn, Cu, Co, Ag, and Sn, said modifier being a member of the group consisting of alkali, alkaline earth, chromium and iron, and relative to the support, the hydrogenating metal is in the range of 3 to 50%, the modifier calculated as its lowest valence state oxide is in the range of 1 to 30%, and the catalyst contains basic material in an amount in the range of 1 to 15%;

such a catalyst wherein the hydrogenating metal is Ni;

such a catalyst wherein the support is active alumina;

such a catalyst containing 1 to 15% of barium oxide or iron oxide, relative to alumina;

such a catalyst containing, prior to reduction:

|  | Parts |
|---|---|
| Activated $Al_2O_3$ | 100 |
| $Cr_2O_3$ | 1 to 20 |
| NiO | 3 to 20 |
| KOH | 2 to 12 | a process for preparing a catalyst which comprises coating an aqueous mixture of a hydrogenating metal salt and modifier percursor on performed support of 4 to 40 mesh, drying at 100° to 200° C. for 1 to 6 hours, heating at 300° to 500° C. for 1 to 6 hours, and then reducing in a hydrogen atmosphere for 10 to 20 hours at 300° to 500° C., said hydrogenating metal being a member of the group consisting of Ni, Zn, Cu, Co, Ag, and Sn, said modifier a member of the group consisting of alkali, alkaline earth, chromium and iron, and relative to the support the hydrogenation metal is in the range of 3 to 50%, the modifier calculated as its lowest valence state oxide is in the range of 1 to 30%, and the catalyst contains basic material in an amount in the range of 1 to 15%;

such a process wherein the hydrogenating metal is Ni, the modifier is chromium and the support is alumina which is treated with an alkaline material prior to coating with the nickel containing mixture;

such a process wherein after drying and before reducing the components are:

|                   | Parts            |
|-------------------|------------------|
| Activated $Al_2O_3$ | 100              |
| $Cr_2O_3$         | 1 to 20, e.g., 15. |
| NiO               | 3 to 20, e.g., 15. |
| KOH               | 3 to 12, e.g., 10. | and other objects which will be apparent as details or embodiments of the invention are set forth hereafter.

In essence the invention involves improved processing techniques in the finding that the hydroperoxides which are readily formed by the oxidation of the above mentioned alkylaromatic hydrocarbon are uniquely suitable and economical for causing the epoxidation of a suitable substrate.

In the first step the aralkyl hydrocarbon is oxidized using atmospheric oxygen, e.g., cumene to cumene hydroperoxide. The oxidation of cumene can be carried out to conversions up to 40% with high selectivity. The resulting oxidation mixture contains the starting material and the hydroperoxide resulting from the oxidation. It also contains very minor amounts of by-products. Introduction of a suitable substrate (such as propylene or equivalent higher olefin) into this mixture (or a concentrate or a solution thereof), either as a molybdenum or equivalent catalyst is being added or after catalyst addition is complete, leads to an epoxide, e.g., propylene oxide and, of course, to an alkylaromatic alcohol, e.g., cumyl alcohol if cumene hydroperoxide is used. Any unreacted hydroperoxide may be converted to the corresponding alcohol by reaction with hydrogen, under mild catalytic conditions. Then the product is separated. Alternatively, the product mixture may be separated as by low pressure distillation before reduction of the hydroperoxide.

There is efficient use of the aralkyl hydrocarbon as the oxidizing oxygen carrier, providing reconversion of the alcohol to the starting hydrocarbon is substantially complete.

It may be desirable to introduce an inert solvent with the hydroperoxide if the concentration thereof is greater than approximately 30–40%. The material chosen should be one which does not react with the peroxide oxygen or the epoxide formed in the reaction. The solvent can be chosen from substances such as t-butyl alcohol, alpha-phenylethanol, cumyl alcohol, benzene, toluene, ethylbenzene, cumene and the like; preferably it is one having the same carbon skeleton as the hydroperoxide used.

In order to indicate still more fully the nature of the present invention, the following examples, of typical procedures are set forth in which parts and percents means parts and percents by weights, respectively, unless otherwise indicated, it being understood that these examples are presented as illustrative only and are not intended to limit the scope of the invention.

In the following series of examples, propylene is epoxidized by cumene hydroperoxide at about 100% peroxide conversion with or without a solvent, and cumyl alcohol is obtained as a by-product. The epoxide is separated by distillation. The cumyl alcohol is subjected to hydrogenolysis by means of hydrogen.

These examples are carried out in the vapor phase, the ratio of hydrogen to cumyl alcohol being 4:1 on a mol basis. The results are set forth in the following table wherein LHSV means liquid hourly spaced velocity.

| Ex. No. | Temp., °C. | Press., p.s.i.g. | LHSV | Percent Conversion | Sel. to Cumene, percent |
|---------|------------|------------------|------|--------------------|-------------------------|
| 1       | 350        | 50               | 4    | 100                | 99.0                    |
| 2       | 350        | 0                | 4    | 100                | 99.5                    |

It is evident from these data that there is good conversion and selectivity in the hydrogenolysis of the cumyl alcohol to cumene.

The cumene is converted to hydroperoxide, which is used to epoxidize more propylene. In a typical cumene oxidation, 400 grams thereof is agitated with 0.1 gm. of t-butylperbenzoate initiator at 130° C. for 2 hours while 60 liters/hour of oxygen is passed therethrough. The conversion is 38% and selectivity to the hydroperoxide is 95%.

The hydrogenolysis catalyst used in the examples is composed of:

|                      | Parts |
|----------------------|-------|
| Activated $Al_2O_3$  | 100   |
| $Cr_2O_3$            | 15    |
| NiO                  | 15    |
| KOH                  | 10    |

For its preparation activated $Al_2O_3$ (Alcoa F-110, from Aluminum Co. of Amercia) is ground to 15 to 20 mesh grain size (U.S. sieves series) and impregnated with aqueous KOH, dried, and finally coated with an aqueous mixture of $Cr_2O_3$ and nickel nitrate. After drying at 150° C. for about 5 hours, it is heated at 450° C. for 5 hours. The catalyst material is then placed in a vertical tube reactor and reduced in a hydrogen atmosphere for 16 hours at 450° C. Cumyl alcohol is then passed over the catalyst, as reported in the examples.

The catalyst may be pelleted (e.g. 0.25 in. by 0.25 in. cylinders), and good results are obtained therewith.

In place of nickel another hydrogenating metal may be used in the catalyst, e.g. Zn, Cu, Co, Ag or Sn, and comparable results are obtained. Mixtures of such metals may be used.

One or more modifiers (alkali, alkaline earth, chromium or iron) are used, and the catalyst includes alkaline material. Comparable results are obtained therewith. It is believed that the modifier probably exists as an oxide in the catalyst, but its exact form is not known.

The temperature may be in the range of 150° C. to 500° C. or even somewhat higher in the hydrogenolysis step. The catalyst mixture drying may be at 100° to 200° C. for 1 to 6 hours, the heating may be at 300° to 500° C. for 1 to 6 hours, and the hydrogen treatment at 300° to 500° C. for 10 to 20 hrs. Relative to 100 parts alumina the catalyst desirably contains 1 to 20 parts $Cr_2O_3$, 3 to 20 parts NiO and 2 to 12 parts KOH, before reduction.

At elevated pressures aryl ring hydrogenation may occur. When the pressure is below 150 p.s.i.g., e.g. reduced to 50 p.s.i.g., ring hydrogenation ceases and hydrogenolysis of an alcohol such as cumyl alcohol to cumene takes place essentially quantitatively. The catalyst has a long active life. The mole ratio of hydrogen to alcohol must be at least 1 to 1. Amounts up to 16:1 are generally used, since there is no advantage in using greater amounts. Preferably, 1:1 to 8:1 mole ratios are used.

The temperature and hydrogen pressure are a function of the type of alcohol used and of the hydrogenation catalyst. With the preferred catalyst of the examples the hydrogenolysis is carried out at temperatures in the range of 150° to 500° C. and hydrogen pressures in the range of 1 to 10 atms., desirably at temperatures below 500° C. and pressures of 150° p.s.i.g. or less.

Residence times are relatively low. Any refracting support may be used, including aluminas, silicas, clays, zeolites, molecular sieves and the like. Catalysts poisons such as sulfur should be excluded. A preferred support is active alumina, and its particle size should be in the range of 4 to 40 mesh. Relative thereto the chromia or the like modifier may be varied in the range of 1 to 30% and the nickel or equivalent metal may be varied in the range of 3 to 50%. KOH or higher molecular weight alkali metal bases are the preferred alkalies. Any soluble nickel or equivalent metal salt or compound may be used, e.g. acetate, and the like, which leaves a residue of nickel or equivalent hydrogenating metal oxide only. The same is true as to the modifier. Mixtures of modifier materials may be included, i.e., in the range of 1 to 15% relative to the support of alkaline material.

If desired, the support may be dispensed so that the catalyst contains 30 to 99 parts of hydrogenating metal (being calculated in its lowest valence state) plus 70 to 1 parts modifier, the latter calculated as its lowest valence state oxide. However, this does not necessarily mean that the material is present in that form or state in the catalyst.

Although the above described process is preferred, any convenient method may be used to prepare the catalyst, as long as the nickel or equivalent metal is intimately mixed with the modifier and on the support, if one is used. The drying and heating procedures are as stated above. The preferred alumina is sometimes referred to as "gamma alumina," and has a surface area of 150 to 300 sq.m./gm.

If the modifier is not included in the recited amount, there is aryl ring hydrogenation, low catalyst life and cracking of carbon to carbon bonds. The presence of a support such as alumina in the stated amount, give better activity and catalyst life. If alkaline material is not present in the recited amount, there is coking and cracking of carbon to carbon bonds.

Temperatures which can be employed in the epoxidation of the substrate vary quite widely depending upon the reactivity and other characteristics of the other reactants. Temperatures broadly in the range of about −20° to +200° C., desirably 40° to 150° C. and preferably 60° to 120° C., can be employed. The reaction is carried out at pressure conditions sufficient to maintain a liquid reaction phase. Although sub-atmospheric pressures can be employed, pressures usually in the range of about atmospheric to 1000 p.s.i.g. are most desirable.

The epoxidation reaction time will vary depending upon the conversion desired. Very short reaction times can be employed where low conversion and/or very active materials are employed. Normally, reaction times from about 10 minutes to 6 hours and desirably from 2 to 24 hours are employed.

The hydroperoxides used are derived from alkylaromatic hydrocarbons having at least one hydrogen atom on a carbon adjacent to the ring. The aromatic ring may be that of benzene or napthalene and may be substituted with fluoro, chloro, bromo, nitro, alkoxyl, acyl or carboxy (or esters thereof) groups. The ring may have one or more side chains with up to twelve carbon atoms in each chain. The chains may be branched. Examples are the hydroperoxides of ethylbenzene, cumene, p-ethyltoluene, isobutylbenzene, tetralin, diisopropylbenzene, p-isopropyltoluene, phenylcyclohexanone, and the like. The preferred species are those derived from cumene and ethylbenzene.

The epoxidation catalysts include compounds of the following: Ti, V, Cr, Cb, Se, Zr, Nb, Mo, Te, Ta, W, Re, U. These may be characterized as forming peracids or as hydroxylation catalysts. By far, the preferred catalysts are compounds of V, Mo, W or Se. Mixtures may be used.

The amount of metal in solution used as catalyst in the epoxidation process can be varied widely, although as a rule it is desirable to use at least 0.00001 mol and more preferably 0.005 to 0.03 mol per mol of hydroperoxide present. Amounts greater than about 0.1 mols seem to give no advantage over smaller amounts although amounts up to 1 mol/mol of hydroperoxide can be employed. The catalyst remains dissolved in the reaction mixture throughout the process and can be reused in the reaction after removal of the reaction products therefrom. The molybdenum compounds include the molybdenum organic salts, the oxides such as $Mo_2O_3$, $MoO_3$, molybdic acid, the molybdenum chlorides and oxychlorides, molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used.

The catalytic components may be employed in the epoxidation in the form of a compound or mixture which is initially soluble in the reaction medium. While solubility will, to some extent depend on the particular reaction medium employed, a suitably soluble substance contemplated by the invention would include hydrocarbon-soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such for example, as acetoacetonates may also be used. Specific and preferred catalytic compounds of this type for use in the invention are the carboxylates and carbonyls of molybdenum, vanadium and tungsten.

As to a substrate, olefinically unsaturated materials which are epoxidized in accordance with the invention include substituted and unsubstituted aliphatic and alicyclic olefins which may be hydrocarbons or esters or alcohols or ketones or ethers or the like generally having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, 1,3-butadiene, styrene, methyl styrene, vinyl toluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyloleate, methyl vinyl ketone, allyl chloride, and the like. In general, all olefinic materials epoxidized by methods previously employed can be epoxidized in accordance with this process.

The lower olefins having about 3 or 4 carbon atoms in an aliphatic chain are especially advantageously epoxidized by this process.

In the oxidation of the substrate, the ratio of substrate to organic peroxy compounds can vary over a wide range. Generally, mol ratios of olefinic groups in substrates to hydroperoxide broadly in the range of 1:50 to 100:1, desirably 1:1 to 10:1, and preferably 2:1 to 5:1 are employed.

The concentration of hydroperoxides in the substrate oxidation reaction mixture at the beginning of the reaction will normally be one percent or more although lesser concentrations will be effective and can be used.

The substrate oxidation reaction can be carried out in the presence of a solvent, and in fact, it is generally desirable that one be used. In general, aqueous solvents are not contemplated. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

Other oxidizable substrates may be used in an analogous manner.

The results achieved in accordance with the invention are indeed surprising and of great commercial value in view of the relatively low cost of the oxygen carrier, and the convenience of the operation.

Hydrocarbon alcohols may be converted by vapor phase hydrogenolysis to hydrocarbons in accordance with the invention. One group of such alcohols comprises those which give corresponding olefins when dehydrated in the vapor phase, in known manner. A most important group of alcohols is the aryl carbinol group including benzyl alcohol, cumyl alcohol, methyl phenyl carbinol and the like, which are converted to the corresponding aralkanes in accordance with the invention.

The process may be carried out batchwise, or in an intermittent or continuous manner. As to the latter, the substrate oxidation reaction may be carried out in an elongated reaction zone such as a tube or a tower or a plurality of reactors connected in series and the hydroperoxide may be introduced at spaced points along the path of flow of the solution.

In view of the foregoing disclosures, variations and modifications thereof will be apparent to one skilled in the art, and it is intended to include within the invention all such variations and modifications except as do not come within the scope of the appended claims.

What is claimed is:

1. A process for the conversion of an aryl carbinol to the corresponding hydrocarbon which comprises reacting said carbinol with hydrogen in the vapor phase at temperatures from 150° C. to 500° C. in the presence of a hydrogenating metal plus modifier catalyst, said hydrogenating metal being a member of the group consisting of Ni, Zn, Cu, Co, Ag and Sn, said modifier being a member of the group consisting of chromium and iron, said catalyst containing 30 to 99% of the hydrogenating metal based on the latter metal plus modifier, the latter being calculated as its lowest valence state oxide and containing 1–15% basic material.

2. A process of claim 1 wherein the catalyst is on a support, and in the catalyst, relative to the support, the hydrogenating metal is in the range of 3 to 50%, the modifier is in the range of 1 to 30%, and the catalyst includes basic material in an amount in the range of 1 to 15%.

3. A process of claim 2 wherein the support is active alumina, the hydrogenating metal is Ni, and the mole ratio of hydrogen to alcohol is at least 1 to 1.

4. A process of claim 3 wherein the catalyst contains 1 to 15% of barium oxide relative to alumina.

5. A process of claim 3 wherein the catalyst contains 1 to 15% of iron oxide, relative to alumina.

6. A process of claim 3 wherein prior to reduction, the catalyst contains:

| | Parts |
|---|---|
| Activated $Al_2O_3$ | 100 |
| $Cr_2O_3$ | 1 to 20 |
| NiO | 3 to 20 |
| KOH | 2 to 12 |

7. A process of claim 6 wherein cumyl alcohol is reduced to cumene with substantially complete conversion and selectivity.

8. A catalyst useful for hydrogenolysis comprising a hydrogenating metal plus modifier on a support containing base material, said hydrogenating metal being a member of the group consisting of Ni, Zn, Cu, Co, Ag, and Sn, said modifier being a member of the group consisting of chromium and iron, and relative to the support, the hydrogenating metal is in the range of 3 to 50%, the modifier calculated as its lowest valence state oxide is in the range of 1 to 30%, and the catalyst contains basic material in an amount in the range of 1 to 15%.

9. A catalyst of claim 8 wherein the hydrogenating metal is Ni.

10. A catalyst of claim 9 wherein the support is active alumina.

11. A catalyst of claim 10 containing 1 to 15% of barium oxide, relative to alumina.

12. A catalyst of claim 10 containing 1 to 15% of iron oxide, relative to alumina.

13. A catalyst of claim 10 containing, prior to reduction:

| | Parts |
|---|---|
| Activated $Al_2O_3$ | 100 |
| $Cr_2O_3$ | 1 to 20 |
| NiO | 3 to 20 |
| KOH | 2 to 12 |

14. A process for preparing a catalyst which comprises coating an aqueous mixture of a hydrogenating metal salt and modifier precursor on preformed support of 4 to 40 mesh, drying at 100° to 200° C. for 1 to 6 hours, heating at 300° to 500° C. for 1 to 6 hours, and then reducing in a hydrogen atmosphere for 10 to 20 hours at 30° to 500° C., said hydrogenating metal being a member of the group consisting of Ni, Zn, Cu, Co, Ag, and Sn, said modifier a member of the group consisting of chromium and iron, and relative to the support the hydrogenation metal is in the range of 3 to 50%, the modifier calculated as its lowest valence state oxide is in the range of 1 to 30%, and the catalyst contains basic material in an amount in the range of 1 to 15%.

15. A process of claim 14 wherein the hydrogenating metal is Ni, the modifier is chromium and the support is alumina which is treated with an alkaline material prior to coating with the nickel containing mixture.

16. A process of claim 15 wherein after drying and before reducing the components are:

| | Parts |
|---|---|
| Activated $Al_2O_3$ | 100 |
| $Cr_2O_3$ | 1 to 20 |
| NiO | 3 to 20 |
| KOH | 2 to 12 |

17. A process of claim 16 wherein the $Cr_2O_3$ content is 15 parts, the NiO content is 15 parts and the KOH content is 10 parts.

References Cited

UNITED STATES PATENTS 2,408,140   9/1946   Gutzeit _____ 252—470

DELBERT E. GANTZ, *Primary Examiner.*

G. E. SCHMITKONS, *Assistant Examiner.*